United States Patent [19]
Rao

[11] Patent Number: 5,596,635
[45] Date of Patent: Jan. 21, 1997

[54] MULTI-STAGE TELECONFERENCING SYSTEM

[75] Inventor: V. R. Gopala Rao, Holmdel, N.J.

[73] Assignee: Lucent Technologies Inc., Murray Hill, N.J.

[21] Appl. No.: 453,295

[22] Filed: May 30, 1995

[51] Int. Cl.⁶ ................................................. H04M 3/56
[52] U.S. Cl. ......................................... 379/202; 379/207
[58] Field of Search ............................... 379/202, 207, 379/201; 370/62; 348/15

[56] References Cited

U.S. PATENT DOCUMENTS

| | | | |
|---|---|---|---|
| 4,360,827 | 11/1982 | Braun ........................................ | 379/202 |
| 5,212,726 | 5/1993 | Dayner et al. ........................... | 379/202 |

*Primary Examiner*—Ahmad F. Matar
*Attorney, Agent, or Firm*—Gerard A. deBlasi; Michael B. Johannesen

[57] ABSTRACT

By teleconferencing participants ($201$-$1$–$201$-$N_1$, $202$-$1$–$202$-$N_2$, $203$-$1$–$203$-$N_3$), who are grouped in diverse geographic locations with a multi-stage system, a significant improvement in the use of interexchange facilities is achieved. The signals transmitted by the telecommunications devices (e.g., telephones) of a group of conference participants located in the same general geographic area are inputted to a first stage bridge (210, 211, 212). Each first stage bridge measures the signal power of each signal and outputs on separate telephone circuits (218, 219, 220), a predetermined number of signals (for example, three) that have the highest signal power. These three signals are transmitted on the interexchange facilities (206) to a second stage bridge (216) to which similar groups of signals from other first stage bridges in other locations are also transmitted. The second stage bridge measures the signal power on each of its inputs from all first stage bridges and combines that same predetermined number of signals (i.e., three) having the highest signal power into a single signal. The combined signal is returned over the interexchange facilities to each first stage bridge and thence to each conference participant.

9 Claims, 3 Drawing Sheets

MULTI-STAGE TELECONFERENCING SYSTEM

TECHNICAL FIELD

This invention relates to providing teleconferencing services on the wireline telecommunications network, and more particularly to providing such services with an efficient use of the interexchange facilities.

BACKGROUND OF THE INVENTION

Teleconferencing services that allow participants from multiple locations to confer with each other over the wireline telecommunications network are well known. With such services, a number of participants can communicate with each other by telephone and participate in a conference as if they were in the same location. As in any "real" single-site conference, the number of participants in a teleconference can range between very few to quite a large number, such as several hundred, or even higher.

A teleconferencing bridge is a software controlled piece of hardware that is used to combine signals from multiple participants that are inputted to its multiple ports over telephone circuits. The bridge then outputs, at each of its ports, a single combined signal that is transmitted over the telephone circuits back to each participant. Obviously, if the voice signals from too many simultaneously talking participants are combined, the signal returned to each conference participant will be unintelligible. Thus, in order to prevent such a gibberish signal from being transmitted back to each participant, the teleconferencing bridge combines only a selected few of the incoming signals for output and return to each participant. Selection of which plural input signals are combined is generally performed by the teleconferencing bridge based on a measurable predetermined signal characteristic, such as signal power. For example, the bridge, measures the power of each of its input signals, selects a predetermined number (for example, three) of those having the highest power, combines these three signals into a single signal, and returns the combined signal to each participant over the wireline teleconununications network. As the conference progresses, different participant's signals are selected, combined and returned. Thus, the bridge dynamically changes the constituent signals of the combined signal that is returned to each conference participant.

A teleconferencing bridge performs the aforedescribed functions of measuring the predetermined characteristic of the signal on each input circuit from the wireline network, such as signal power, selecting a predetermined number of the signals having the highest power, combining those selected predetermined number of signals, and bridging the combined signal back to each wireline circuit. Such teleconferencing bridges currently exist, can be located anywhere, and can handle conferences having a large number of participants. Furthermore, those ports of the bridge that are not being used for one conference can handle the bridging functions for other conferences.

Generally, a teleconferencing bridge is software controlled through a control system, which is responsive to an operator input. A conference operator obtains from the conference organizer information such as the time and date of the conference, the expected duration of the conference, and the number of participants. A specific physical bridge is then reserved for the specified time, date and duration, together with the number of ports on the bridge necessary to support the maximum number of conference participants. Codes are assigned for the conference host and for the conference participants allowing them access to the bridge. During the reserved conference time, the control system configures the allocated ports together and permits access to the bridge by the host and the participants. As previously described, the bridge combines the predetermined number of strongest input signals into a single output signal, which is outputted on each port to each participant. That predetermined number is generally preset at the bridge. Also, during the conference the control system tracks usage of the bridge for billing purposes.

FIG. 1 shows a prior art teleconferencing configuration in which multiple participants are located around the country but concentrated in groups in the geographic areas of New York, Dallas, and San Francisco. Participants 101-1–101-$N_1$ are located in various locations throughout the New York area, participants 102-1–102-$N_2$ are located in various locations throughout the Dallas area, and participants 103-1–103-$N_3$ are located in various locations throughout the San Francisco area. There is thus a total of $N_1+N_2+N_3$ conference participants. The telecommunications device, such as a telephone, associated with each New York participant is connected to the interexchange wireline network 106 through an associated local exchange switch (LES) 104-k (k=1, 2, ... ). Participants 101-1 and 101-2 are shown located within the same local exchange and are thus associated with the same local exchange switch 104-1. Each New York local exchange switch 104-k (k=1, 2, ... ) is connected to an interexchange switch 105, such as a 4ESS® switch, manufactured by AT&T Corp., which is connected to the wireline interexchange network 106. The telecommunications device of each San Francisco participant is similarly connected through associated local exchange company switches 107-k (k=1, 2, ... ), and through interexchange switch 108, to the wireline interexchange network 106. The telecommunications device of each Dallas participant is directly connected to the interexchange network 106 through interexchange switch 109, bypassing the local exchange network.

The interexchange switches 105, 109, and 108 thus connect $N_1$, $N_2$, and $N_3$ circuits, respectively, to the wireline interexchange network 106. These $N_1+N_2+N_3$ long distance circuits are connected through the network 106 to the interexchange switch 110 associated with the particular teleconference bridge hardware 111 which has been reserved for the conference and which is located in a different geographic area. As shown in FIG. 1, the $N_1+N_2+N_3$ output circuits (telephone lines) 120 of switch 110 are directly connected to the particular $N_1+N_2+N_3$ ports of bridge 111 that have been reserved for the conference. If bridge 111 is not directly associated with and directly connected to an interexchange switch 110, circuits 120 would be connected to a local exchange switch (not shown) and thence to bridge 111.

As previously described, a control system 112, after earlier communication over a data network 113 with the conference arranger 114, configures the bridge 111 by specifying the particular $N_1+N_2+N_3$ ports for use by the conference. As noted hereinabove but not shown in FIG. 1, bridge 111 can simultaneously handle other conferences on any of its other available ports. Bridge 111 selects from among the $N_1+N_2+N_3$ input signals present at its specified $N_1+N_2+N_3$ ports, the N signals (for example, three) having the highest power. These three selected signals are combined into a single signal, which is returned on each of the circuits 120 to interexchange switch 110 for transmission through the interexchange network 106 back to the telecommunications device of each New York, Dallas, and San Francisco conference participant. Bridge 111 constantly changes the three selected signals bridged to the telecommunications device associated with each participant in accordance with the dynamics of the signals transmitted by all the conference participants' devices.

As can be noted in FIG. 1, a total of $N_1+N_2+N_3$ two-way interexchange circuits are required to support the single conference during which, at any instant, only three different participant's signals are combined and returned to all the participants. When $N_1$, $N_2$ and $N_3$ are large numbers, which is often the case in large teleconferencing situations, a highly inefficient use is made of the interexchange facilities.

SUMMARY OF THE INVENTION

A significant improvement in the efficiency of use of the interexchange facilities is achieved by using the multi-stage teleconferencing system of the present invention. In accordance with the present invention, rather than performing all bridging functions in a single bridging circuit, the bridging functions are distributed in a multi-stage manner. At a first stage, the circuits of conference participants sharing a generally common geographic locality are inputted to the ports of a first stage bridge which selects for output, the N input signals transmitted by those participants' telecommunications devices having a measurably best predetermined signal characteristic. The selected N signals are transmitted by the first stage bridge on N separate circuits through the interexchange facilities to a second stage bridge. At the second stage, the N individual signals having the same measurably best predetermined signal characteristic from among all the groups of N signals received from each of the first stage bridges are selected and combined into a single signal. The combined signal is returned by the second stage bridge over each of the interexchange circuits to each first stage bridge and thence to the telecommunications device of each conference participant. Thus, for example, if the conference participants are grouped in three locations, then only 3N interexchange circuits are necessary to maintain the conference proceedings among all the participants instead of a number of interexchange circuits equal to the total number of all participants. For conferences with a large number of participants, therefore, there results a substantial improvement in the efficiency of use of the long distance facilities.

DETAILED DESCRIPTION

Figure 1:
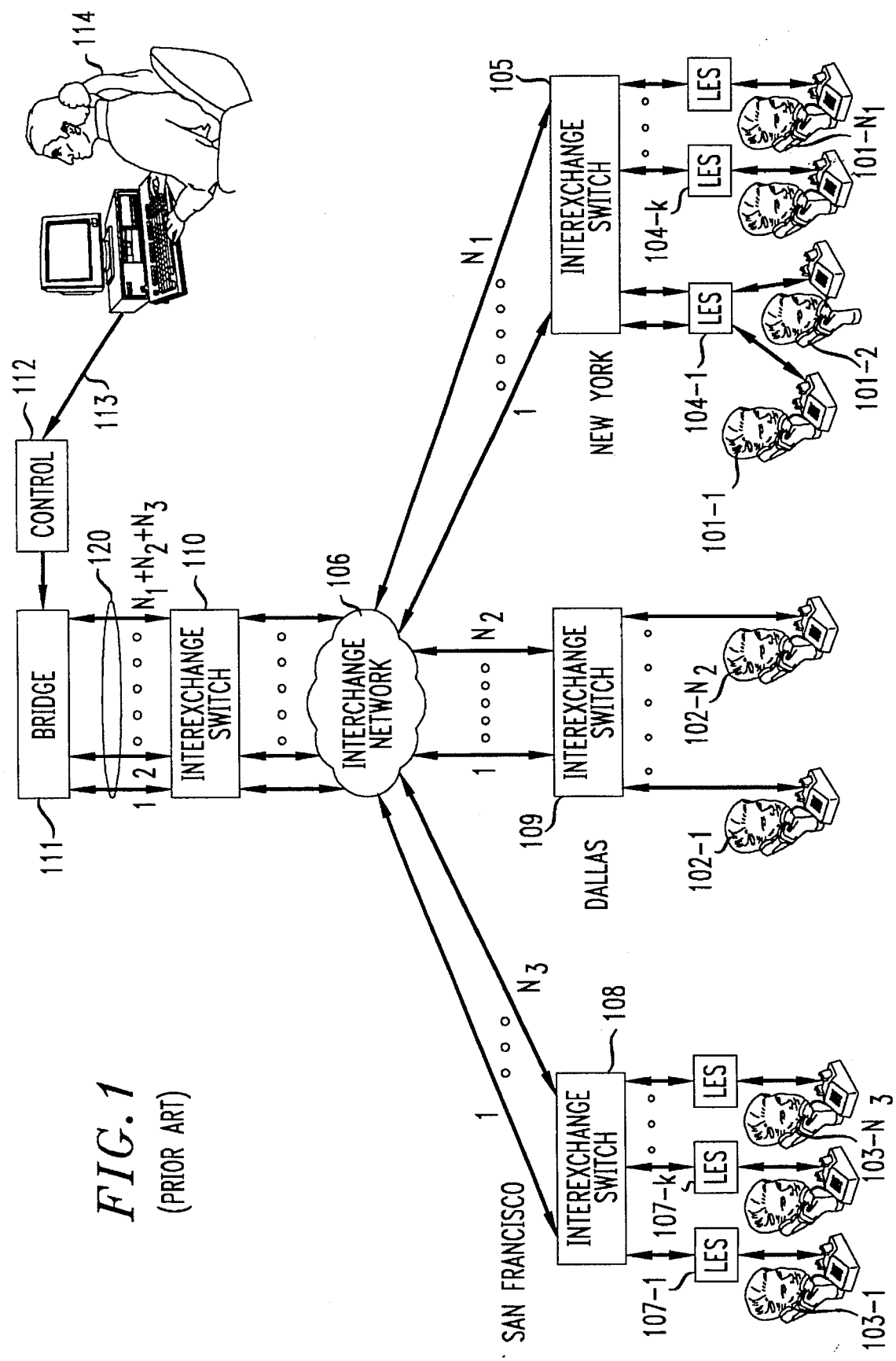
FIG. 1 is a block diagram of the above-described prior art teleconferencing system.
Figure 2:
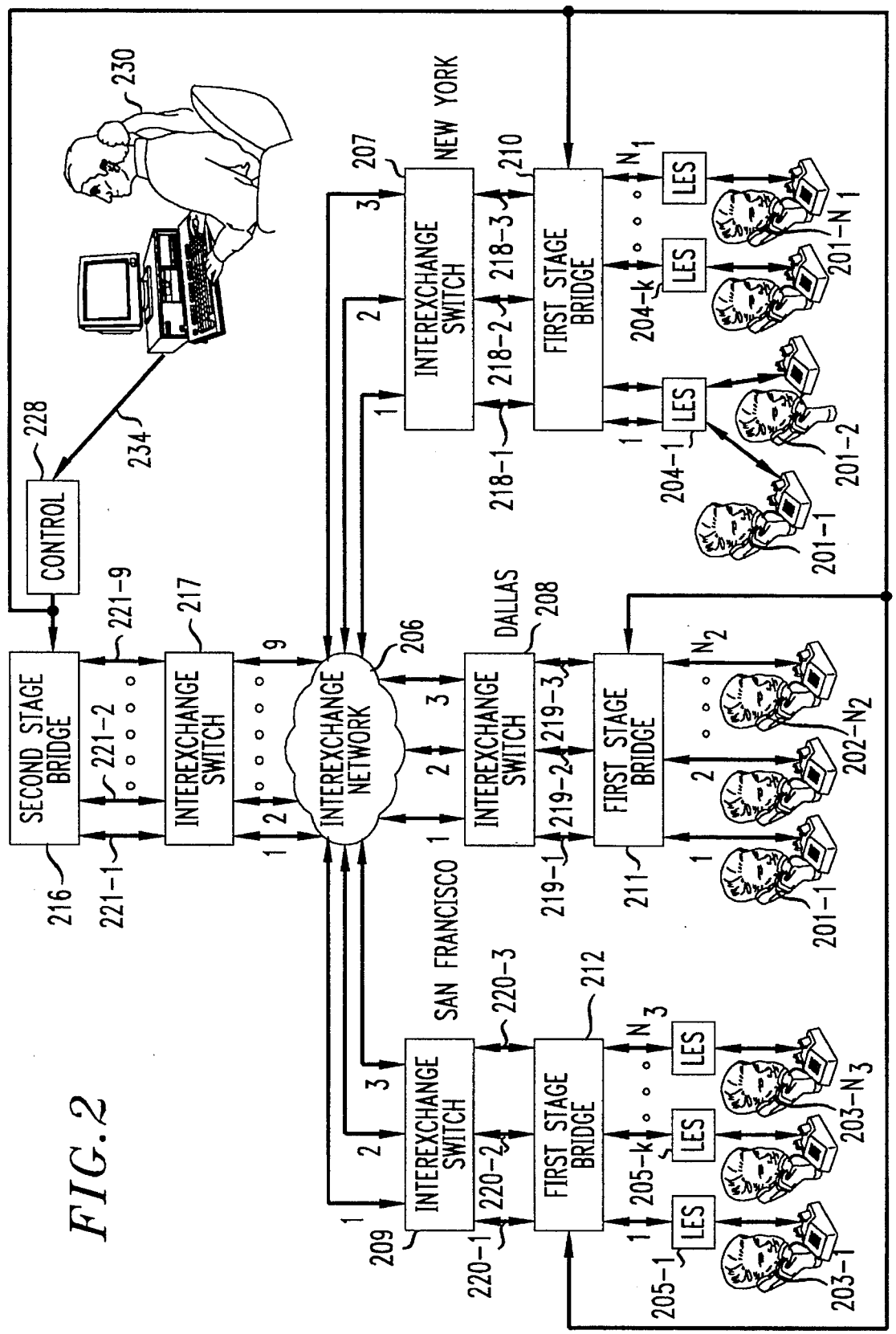
FIG. 2 is a block diagram of the multi-stage teleconferencing system of the present invention.

With reference to FIG. 2, the multi-stage multistage teleconferencing system of the present invention is illustrated. As in the prior art system of FIG. 1 discussed hereinabove, the system in FIG. 2 includes $N_1$ participants 201-1–201-$N_1$ and their associated telecommunications devices located in the New York geographic area, $N_2$ participants 202-1–202-$N_2$ and their associated telecommunications devices located in the Dallas geographic area, and $N_3$ participants 203-1–203-$N_3$ and their associated telecommunications devices located in the San Francisco geographic area. Also as in FIG. 1, the New York participants' telecommunications devices are connected to the interexchange network 206 through associated local exchange switches 204-k (k=1, 2, . . . ), and the San Francisco participants' devices are connected to the interexchange network 206 through their associated local exchange switches 205-k (k=1, 2, . . . ). New York participants 201-1 and 201-2 are associated with the same local exchange switch 204-1. The long distance interexchange network 206 is accessed on switched circuits through interexchange switches 207, 208, and 209, located in New York, Dallas, and San Francisco, respectively. These interexchange switches may be 4ESS® switches manufactured by AT&T Corp.

In accordance with the present invention, a first stage teleconferencing bridge 210, 211 and 212, is associated with each interexchange bridge 207, 208 and 209, respectively. The telecommunications device of each New York participant 201-1–201-$N_1$ is connected through its associated local exchange switch 204-k (k=1, 2, . . . ) to bridge 210. As in FIG. 1, the telecommunications device of each Dallas participant 202-1–202-$N_2$ bypasses the local exchange network and is connected directly to bridge 211. The telecommunications device of each San Francisco participant 203-1–203-$N_3$ is connected to bridge 212. A second stage bridge 216, located in a forth location, is connected through interexchange switch 217 to the interexchange network 206. A control system 228 controls the configuration of bridge 216.

The multi-stage bridging arrangement consisting of three first stage bridges 207, 208 and 209 and a single second stage bridge 210 functions as described hereinafter. The $N_1$ signals transmitted by the devices of participants 201-1–201-$N_1$ are inputted to $N_1$ ports of first stage bridge 210. Bridge 210 selects the three inputs having the highest signal power thereon and outputs these three selected signals individually on output circuits 218-1–218-3. These three output signals are inputted to interexchange switch 207 and transmitted over the wireline interexchange network 206 on three separate interexchange circuits. Similarly, the $N_2$ signals transmitted by the telecommunications devices of participants 202-1–201-$N_2$ are inputted to $N_2$ ports of first stage bridge 211, which selects the three inputs thereof having the highest signal power and outputs these three selected signals individually on output circuits 219-1–219-3. These three output signals are inputted to interexchange switch 208 and transmitted over the wireline interexchange network 206 on three separate interexchange circuits. Finally, the $N_3$ signals transmitted by the devices of participants 203-1–203-$N_3$ are inputted to $N_3$ ports of first stage bridge 212, which selects the three inputs thereof having the highest signal power and outputs these three selected signals individually on output circuits 220-1–220-3. These three output signals are inputted to interexchange switch 209 and transmitted over the wireline interexchange network 206 on three separate interexchange circuits.

Figure 3:
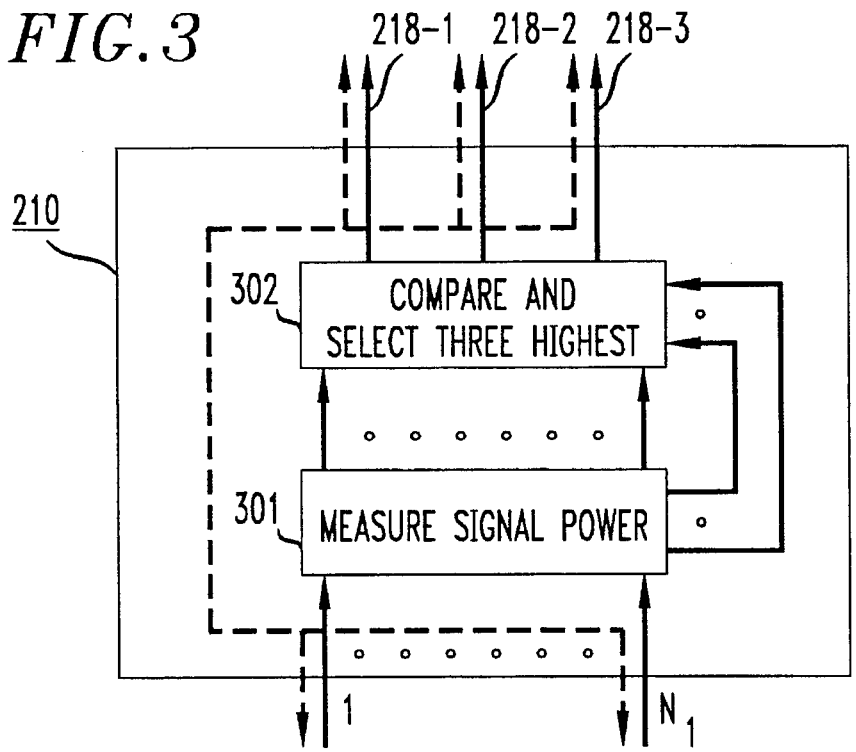
FIG. 3 is a functional block diagram of a first stage bridge used in the multi-stage teleconferencing system of the present invention in FIG. 2.

FIG. 3 is a functional block diagram a first stage bridge, and more specifically, bridge 210 in FIG. 2. Similar numerical designations are given to those elements in FIG. 3 that are common to elements in FIG. 2. The $N_1$ telephone circuits connected to the telecommunications devices of participants 201-1–201-$N_1$ in FIG. 2 are connected in bridge 210 to a circuit 301 which measures the signal power of the signal transmitted by each device. The signal power of each signal is compared by circuit 302, which outputs on output circuits 218-1–218-3 the three signals having the highest power.

The signals on the nine output circuits of first stage bridges 207, 208 and 209 are transmitted through interexchange network 206 to interexchange switch 217 and thereafter over circuits 221-1–221-9 to nine input ports of second stage bridge 216. Second stage bridge 216 selects from the input signals on circuits 221-1–221-9 connected to its nine input ports, the three signals having the highest signal power. These three selected signals are then combined into a single signal and transmitted back over each of the nine circuits 221-1–221-9 to interexchange switch 217, through the interexchange network 206, and back to each first stage bridge 210, 211, and 212. Each of the signals returned on interexchange circuits 218-1–218-3, 219-1–219-3, and 220-1–220-3 to first stage bridge 210, 221 and 212, respectively, is identical and each first stage bridge outputs this same signal at each of its ports to each telecommunications device of the $N_1+N_2+N_3$ conference participants 201-1–210-$N_1$, 202-1–202-$N_2$ and 203-1–203-$N_3$. During the conference, the three signals selected by each of the first stage bridges 210, 211 and 212 changes as the signal power transmitted by each participant's telecommunications device changes. The nine signals inputted to second stage bridge 216 are thus constantly changing and thus also are the constituent signals of the three signals selected and combined by bridge 216 and returned to each first stage bridge, and ultimately to each participant's device.

Figure 4:
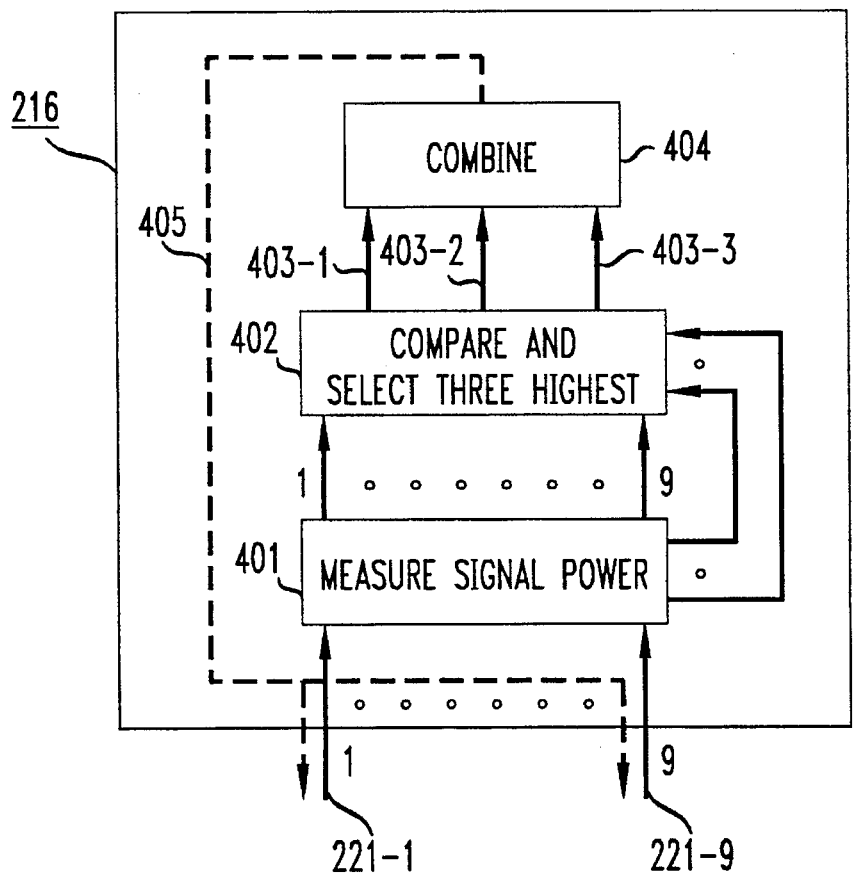
FIG. 4 is a functional block diagram of a second stage bridge used in the multi-stage teleconferencing system of the present invention in FIG. 2.

FIG. 4 is a block diagram of second stage bridge 216. Similar numerical designations are given to those elements common to elements in FIG. 2. The nine best signals on telephone circuits 221-1–221-9 from bridges 210, 211 and 212 in FIG. 2 are inputted to a circuit 401 which measures the signal power of each. Circuit 402 compares the signal power of each signal and selects the three signals having the highest signal power and outputs the selected signals on leads 401-1–401-3. A signal combining circuit 404 combines these three signals into a single signal on lead 405, which is bridged back for return transmission on each telephone circuit 221-1–221-9 to each first stage bridge. In FIG. 3, the signals returned on circuits 218-1–218-3, which are all identical, are bridged to the input circuits of the first stage bridge for return to each participant's telecommunications device. The second stage bridge thus operates in the same substantial manner as the previously described prior art bridge. Rather than its number of inputs being equal to the number of signals from all conference participants' terminals, its substantially reduced number of inputs is the number of signals selected by the first stage bridge.

As can be noted in FIG. 2, a total of only nine long distance circuits is necessary to configure the entire teleconference regardless of the magnitudes of $N_1$, $N_2$ and $N_3$. Compared to the prior art arrangement, which required a total of $N_1+N_2+N_3$ long distance circuits, much more efficient use of the long distance facilities is made.

Although described as measuring signal power, the first and second stage bridges could measure alternative signal characteristic such as signal amplitude or signal-to-noise ratio, in which case the signals with the highest amplitudes or signal-to-noise ratios would be selected. Other signal characteristics could also be used, or a combination thereof. Depending upon the particular signal characteristic, the signals with a highest or lowest measurable characteristic would be selected. Thus, the signals selected by the bridges are those with the best measured characteristic as the term "best" is applicable to the particular characteristic or characteristics used.

A conference operator 230 configures the conference in FIG. 2 in a similar manner to that used by the conference operator in configuring the conference in FIG. 1. The conference operator 230, after consulting with a conference organizer, establishes a data connection on a data link 234 with control system 228. Control system 228 allocates the ports in each first stage bridge necessary to support the number of conference participants in New York, Dallas and Chicago during the conference time period and allocates the ports necessary by the second stage bridge 216 to support the nine circuits inputted thereto during that same period. Alternatively, separate control systems linked together over a data network could separately control each bridge in response to inputs from the central conference operator's terminal.

Each bridging stage can simultaneously support multiple teleconferences. Thus, for example, those ports not being used in first stage bridge 211 in Dallas for the illustrated conference may be used by other Dallas participants for conferences with other groups of participants. Telecommunications devices of participants in the other conferences may be connected to unused ports of second stage bridge 216 or to other second stage bridges. Similarly, the unused ports of second stage bridge 216 may be used for a conference having participants in locations other than New York, Dallas and San Francisco.

Each of the first stage bridges 210, 211 and 212 can also simultaneously and individually function as a second stage bridge for another conference. Thus, telecommunications devices of participants in Houston, New Orleans and San Antonio may be connected through other non-illustrated first stage bridges through the interexchange network 206 to nine unused ports on bridge 211 in Dallas. Similarly second stage bridge 216 can simultaneously function as a first stage bridge for participants local to it and connected to its unused ports. Furthermore, the outputs of a first stage bridge can functions as inputs to a second first stage bridge. Thus, for example, in the conference shown in FIG. 2, another group of participants in the general New York area could be connected to another first stage bridge. The three selected inputs of this other first stage one bridge would then be connected to three additional ports of bridge 210. Bridge 210 would then select the three strongest signals from among the signals from its $N_1$ subscribers 201-1–210-$N_1$ and the three selected signals inputted from the other first stage bridge to which it is connected.

The multi-stage bridging arrangement of the present invention provides a high degree of flexibility in arranging a conference among a large number of participants who may be concentrated in localized areas. Although described in conjunction with a voice teleconferencing service in which the telecommunications device is a telephone, the present invention could be readily extended to multimedia teleconferencing applications in which the telecommunications device is a multimedia terminal which generates both a video signal and a voice signal. As in the just described system, a characteristic of a participant's multimedia signal, such as voice signal power, can be used to determine the particular signals to be bridged together and returned to each participant's terminal.

The above-described embodiment is illustrative of the principles of the present invention. Other embodiments could be devised by those skilled in the art without departing from the spirit and scope of the present invention.

The invention claimed is:

1. An arrangement for combining signals transmitted by a plurality of telecommunications devices into a single combined signal and returning the combined signal to each of said telecommunications devices, said telecommunications devices being in a plurality of groups of telecommunications devices associated with different geographic areas, the arrangement comprising:

- a plurality of first bridging means, each of said first bridging means being associated with one of said groups of said telecommunications devices, each of said first bridging means comprising means for measuring a predetermined signal characteristic from the signals transmitted by the associated group of said telecommunications devices and means for individually outputting onto separate telecommunications circuits a predetermined number of said signals generated by said associated group of said telecommunications devices that have the best predetermined signal characteristic; and
- second bridging means connected to each of the separate telecommunications circuits at the output of each of said plurality of first bridging means, said second bridging means comprising means for measuring said predetermined signal characteristic from said predetermined number of signals outputted by each of said first bridging means, means for forming said single combined signal by combining only said predetermined number of signals that have the best predetermined signal characteristic from among the signals outputted on said telecommunications circuits by each of said plurality of first bridging means; and means for outputting said single combined signal onto said telecommunications circuits for transmission to each of said first bridging means:
- wherein each of said first bridging means transmits said single combined signal to each of said teleconununications devices.

2. The arrangement of claim 1 wherein said telecommunications circuits are connected through an interexchange network.

3. The arrangement of claim 1 wherein the signals transmitted by said telecommunications devices are voice signals and said predetermined signal characteristic is signal power.

4. The arrangement of claim 1 wherein said telecommunications devices are connected to said first bridging means over local telephone loops.

5. The arrangement of claim 1 wherein the signals outputted by said plurality of first bridging means and the constituent signals of said single combined signal formed by said second bridging means are dynamically changed as the predetermined signal characteristic of each of the signals transmitted by said telecommunications devices varies.

6. A method for teleconferencing together signals from a plurality of telecommunications devices, the telecommunications devices being arranged in groups of telecommunications devices associated with different geographic areas, the method comprising the steps of:

in each group of telecommunications devices:
- measuring a predetermined signal characteristic of the signals from the telecommunications devices in the group;
- selecting a predetermined number of the signals from the telecommunications devices in the group that have the highest measured predetermined signal characteristic; and
- individually transmitting the selected predetermined number of signals to a common teleconferencing location; and at the common teleconferencing location:
- measuring the predetermined signal characteristic of the selected predetermined number of signals received from all groups of telecommunications devices;
- selecting said predetermined number of signals having the highest measured predetermined signal characteristic from the measured signals of the selected predetermined number of signals received from all groups of telecommunications devices;
- combining the selected predetermined number of signals into a single combined signal; and
- transmitting to each telecommunications device the combined signal.

7. The method of claim 6 wherein the signals from said telecommunications devices are voice signals and the predetermined signal characteristic is signal power.

8. The method of claim 6 wherein the signals transmitted to the common teleconferencing location are transmitted through an interexchange network.

9. The method of claim 6 wherein the signals selected for transmission in each group of telecommunications devices and the signals selected for combining at the common teleconferencing locations are dynamically changed as the predetermined signal characteristic of each of the signals from the plurality of telecommunications devices varies.

* * * * *